United States Patent
Harris, Jr. et al.

(10) Patent No.: US 8,684,664 B2
(45) Date of Patent: Apr. 1, 2014

(54) APPARATUS AND METHODS FOR COOLING PLATFORM REGIONS OF TURBINE ROTOR BLADES

(75) Inventors: John Wesley Harris, Jr., Taylors, SC (US); Scott Edmond Ellis, Easley, SC (US); Xiaoyong Fu, Greer, SC (US); Adrian Lional Scott, Greer, SC (US)

(73) Assignee: General Electric Company, Schenectady, NY (US)

( * ) Notice: Subject to any disclaimer, the term of this patent is extended or adjusted under 35 U.S.C. 154(b) by 853 days.

(21) Appl. No.: 12/895,035

(22) Filed: Sep. 30, 2010

(65) Prior Publication Data
US 2012/0082550 A1 Apr. 5, 2012

(51) Int. Cl.
*F01D 5/08* (2006.01)

(52) U.S. Cl.
USPC ...... 415/115; 416/97 R; 416/193 A; 416/224; 29/889.721

(58) Field of Classification Search
USPC .... 415/115, 116; 416/96 R, 96 A, 97 A, 224, 416/193 A; 29/889.721, 889.72, 889.722
See application file for complete search history.

(56) References Cited

U.S. PATENT DOCUMENTS

| | | |
|---|---|---|
| 3,950,114 A | 4/1976 | Helms |
| 4,712,979 A | 12/1987 | Finger |
| 4,798,514 A | 1/1989 | Pask |
| 5,340,278 A | 8/1994 | Magowan |
| 5,382,135 A | 1/1995 | Green |
| 5,813,835 A | 9/1998 | Corsmeier et al. |
| 6,017,819 A | 1/2000 | Brigham et al. |
| 6,019,579 A | 2/2000 | Fukuno et al. |
| 6,120,249 A | 9/2000 | Hultgren et al. |
| 6,190,130 B1 | 2/2001 | Fukue et al. |
| 6,196,799 B1 | 3/2001 | Fukue et al. |
| 6,402,417 B1 | 6/2002 | Okamoto |
| 6,431,833 B2 | 8/2002 | Jones |
| 6,478,540 B2 | 11/2002 | Abuaf et al. |
| 7,097,424 B2 | 8/2006 | Cunha et al. |
| 7,147,439 B2 | 12/2006 | Jacala et al. |
| 7,198,467 B2 | 4/2007 | Keith et al. |
| 7,347,664 B2 | 3/2008 | Kayser et al. |
| 7,416,391 B2 | 8/2008 | Veltre et al. |
| 2006/0024151 A1* | 2/2006 | Keith et al. ............... 415/97 |
| 2006/0056968 A1 | 3/2006 | Jacala et al. |
| 2007/0189896 A1 | 8/2007 | Itzel et al. |
| 2012/0082548 A1* | 4/2012 | Ellis et al. ............... 416/95 |
| 2012/0082565 A1* | 4/2012 | Ellis et al. ............... 416/97 R |

FOREIGN PATENT DOCUMENTS

JP 2005146858 A * 6/2005

* cited by examiner

*Primary Examiner* — Edward Look
*Assistant Examiner* — Jesse Prager
(74) *Attorney, Agent, or Firm* — Mark E. Henderson; Ernest G. Cusick; Frank A. Landgraff (57) ABSTRACT

A platform cooling configuration in a turbine rotor blade that includes platform slot formed through at least one of the pressure side slashface and the suction side slashface; a removably-engaged impingement insert that separates the platform into two radially stacked plenums, a first plenum that resides inboard of a second plenum; a high-pressure connector that connects the first plenum to the high-pressure coolant region of the interior cooling passage; a low-pressure connector that connects the second plenum to the low-pressure coolant region of the interior cooling passage.

22 Claims, 10 Drawing Sheets

APPARATUS AND METHODS FOR COOLING PLATFORM REGIONS OF TURBINE ROTOR BLADES

BACKGROUND OF THE INVENTION

The present application relates generally to combustion turbine engines, which, as used herein and unless specifically stated otherwise, includes all types of combustion turbine engines, such as those used in power generation and aircraft engines. More specifically, but not by way of limitation, the present application relates to apparatus, systems and/or methods for cooling the platform region of turbine rotor blades.

A gas turbine engine typically includes a compressor, a combustor, and a turbine. The compressor and turbine generally include rows of airfoils or blades that are axially stacked in stages. Each stage typically includes a row of circumferentially spaced stator blades, which are fixed, and a set of circumferentially spaced rotor blades, which rotate about a central axis or shaft. In operation, the rotor blades in the compressor are rotated about the shaft to compress a flow of air. The compressed air is then used within the combustor to combust a supply of fuel. The resulting flow of hot gases from the combustion process is expanded through the turbine, which causes the rotor blades to rotate the shaft to which they are attached. In this manner, energy contained in the fuel is converted into the mechanical energy of the rotating shaft, which then, for example, may be used to rotate the coils of a generator to generate electricity.

Figure 1:
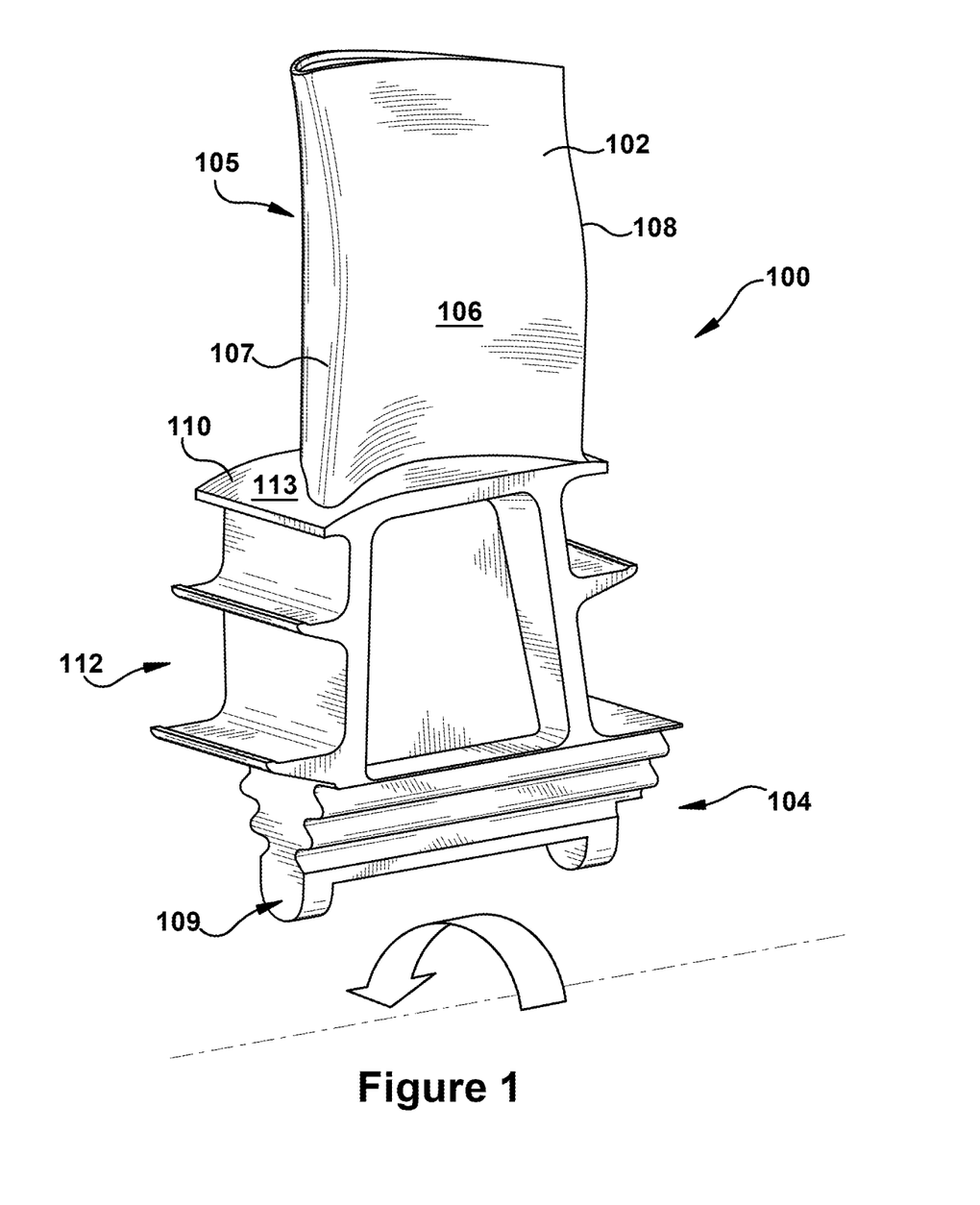
FIG. 1 illustrates a perspective view of an exemplary turbine rotor blade in which embodiments of the present invention may be employed.
Figure 2:
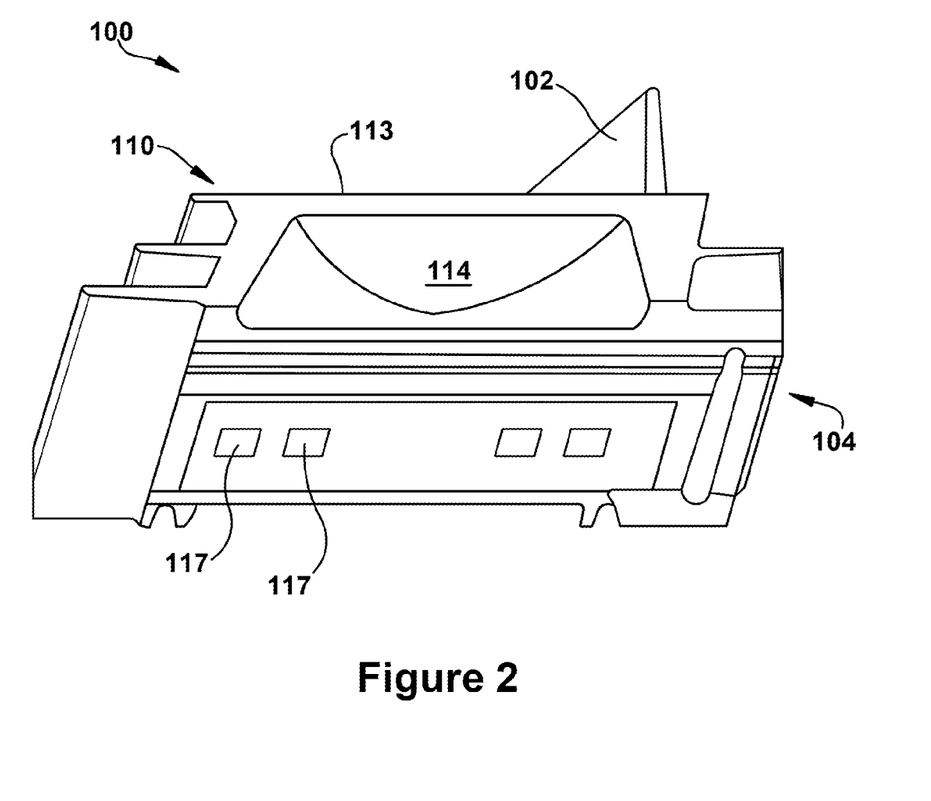
FIG. 2 illustrates an underside view of a turbine rotor blade in which embodiments of the present invention may be used.

Referring to FIGS. 1 and 2, turbine rotor blades 100 generally include an airfoil portion or airfoil 102 and a root portion or root 104. The airfoil 102 may be described as having a convex suction face 105 and a concave pressure face 106. The airfoil 102 further may be described as having a leading edge 107, which is the forward edge, and a trailing edge 108, which is the aft edge. The root 104 may be described as having structure (which, as shown, typically includes a dovetail 109) for affixing the blade 100 to the rotor shaft, a platform 110 from which the airfoil 102 extends, and a shank 112, which includes the structure between the dovetail 109 and the platform 110.

As illustrated, the platform 110 may be substantially planar. (Note that "planar," as used herein, means approximately or substantially in the shape of a plane. For example, one of ordinary skill in the art will appreciate that platforms may be configured to have an outboard surface that is slight curved and convex, with the curvature corresponding to the circumference of the turbine at the radial location of the rotor blades. As used herein, this type of platform shape is deemed planar, as the radius of curvature is sufficiently great to give the platform a flat appearance.) More specifically, the platform 110 may have a planar topside 113, which, as shown in FIG. 1, may include an axially and circumferentially extending flat surface. As shown in FIG. 2, the platform 110 may have a planar underside 114, which may also include an axially and circumferentially extending flat surface. The topside 113 and the bottom side 114 of the platform 110 may be formed such that each is substantially parallel to the other. As depicted, it will be appreciated that the platform 110 typically has a thin radial profile, i.e., there is a relatively short radial distance between the topside 113 and the bottom side 114 of the platform 110.

In general, the platform 110 is employed on turbine rotor blades 100 to form the inner flow path boundary of the hot gas path section of the gas turbine. The platform 110 further provides structural support for the airfoil 102. In operation, the rotational velocity of the turbine induces mechanical loading that creates highly stressed regions along the platform 110 that, when coupled with high temperatures, ultimately cause the formation of operational defects, such as oxidation, creep, low-cycle fatigue cracking, and others. These defects, of course, negatively impact the useful life of the rotor blade 100. It will be appreciated that these harsh operating conditions, i.e., exposure to extreme temperatures of the hot gas path and mechanical loading associated with the rotating blades, create considerable challenges in designing durable, long-lasting rotor blade platforms 110 that both perform well and are cost-effective to manufacture.

One common solution to make the platform region 110 more durable is to cool it with a flow of compressed air or other coolant during operation, and a variety of these type of platform designs are known. However, as one of ordinary skill in the art will appreciate, the platform region 110 presents certain design challenges that make it difficult to cool in this manner. In significant part, this is due to the awkward geometry of this region, in that, as described, the platform 110 is a periphery component that resides away from the central core of the rotor blade and typically is designed to have a structurally sound, but thin radial thickness.

To circulate coolant, rotor blades 100 typically include one or more hollow cooling passages 116 (see FIGS. 3, 4 and 5) that, at minimum, extend radially through the core of the blade 100, including through the root 104 and the airfoil 102. As described in more detail below, to increase the exchange of heat, such cooling passages 116 may be formed having a serpentine path that winds through the central regions of the blade 100, though other configurations are possible. In operation, a coolant may enter the central cooling passages via one or more inlets 117 formed in the inboard portion of the root 104. The coolant may circulate through the blade 100 and exit through outlets (not shown) formed on the airfoil and/or via one or more outlets (not shown) formed in the root 104. The coolant may be pressurized, and, for example, may include pressurized air, pressurized air mixed with water, steam, and the like. In many cases, the coolant is compressed air that is diverted from the compressor of the engine, though other sources are possible. As discussed in more detail below, these cooling passages typically include a high-pressure coolant region and a low-pressure coolant region. The high-pressure coolant region typically corresponds to an upstream portion of the cooling passage that has a higher coolant pressure, whereas the low-pressure coolant region corresponds to a downstream portion having a relatively lower coolant pressure.

In some cases, the coolant may be directed from the cooling passages 116 into a cavity 119 formed between the shanks 112 and platforms 110 of adjacent rotor blades 100. From there, the coolant may be used to cool the platform region 110 of the blade, a conventional design of which is presented in FIG. 3. This type of design typically extracts air from one of the cooling passages 116 and uses the air to pressurize the cavity 119 formed between the shanks 112/platforms 110. Once pressurized, this cavity 119 then supplies coolant to cooling channels that extend through the platforms 110. After traversing the platform 110, the cooling air may exit the cavity through film cooling holes formed in the topside 113 of the platform 110.

Figure 3:
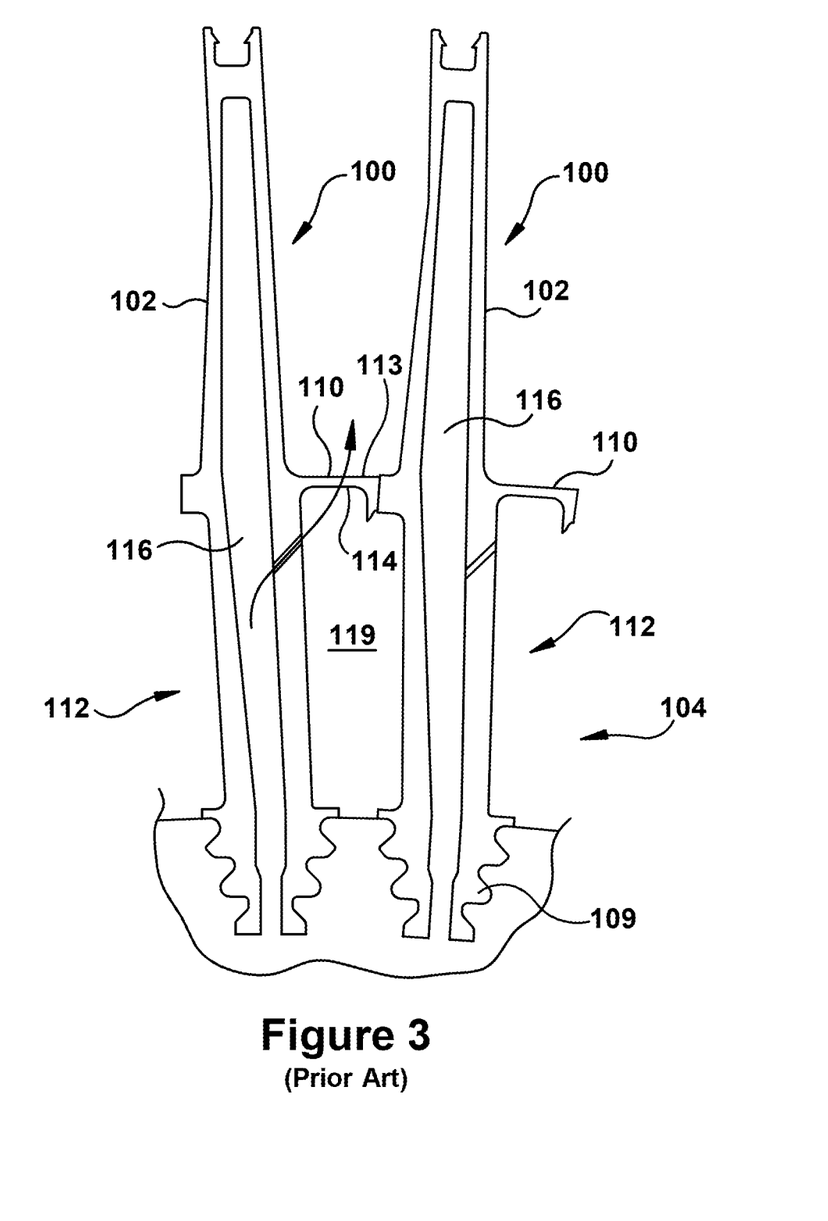
FIG. 3 illustrates a sectional view of neighboring turbine rotor blades having a cooling system according to conventional design.

It will be appreciated, however, that this type of conventional design has several disadvantages. First, the cooling circuit is not self-contained in one part, as the cooling circuit is only formed after two neighboring rotor blades 100 are assembled. This adds a great degree of difficulty and complexity to installation and pre-installation flow testing. A second disadvantage is that the integrity of the cavity 119 formed between adjacent rotor blades 100 is dependent on how well the perimeter of the cavity 119 is sealed. Inadequate sealing may result in inadequate platform cooling and/or wasted cooling air. A third disadvantage is the inherent risk that hot gas path gases may be ingested into the cavity 119 or the platform itself 110. This may occur if the cavity 119 is not maintained at a sufficiently high pressure during operation. If the pressure of the cavity 119 falls below the pressure within the hot gas path, hot gases will be ingested into the shank cavity 119 or the platform 110 itself, which typically damages these components as they were not designed to endure exposure to the hot gas-path conditions.

Figure 4:
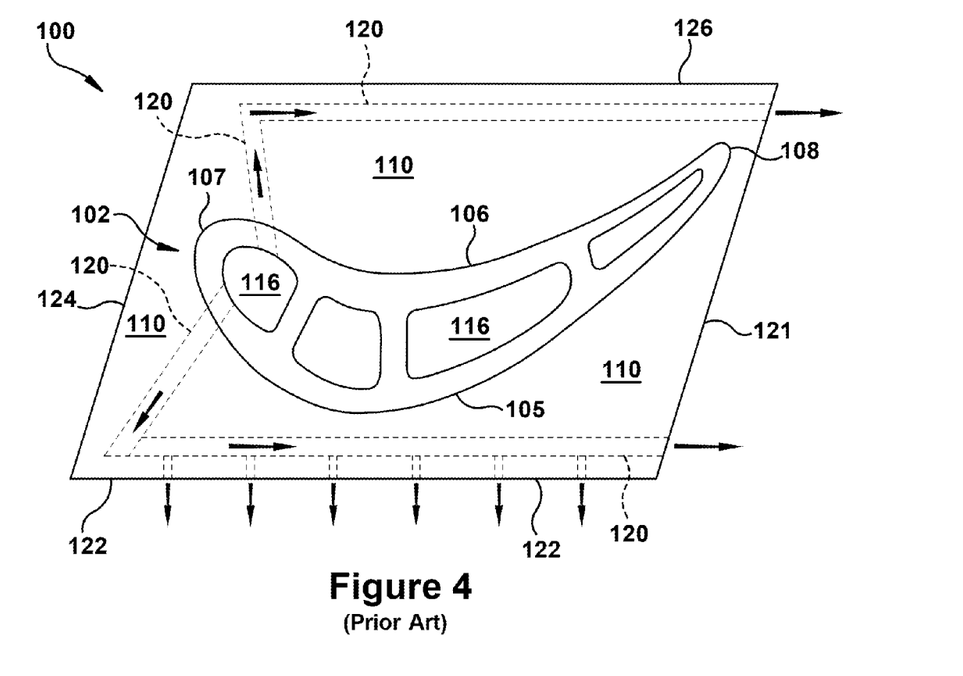
FIG. 4 illustrates a top view of a turbine rotor blade having a platform with interior cooling channels according to conventional design.
Figure 5:
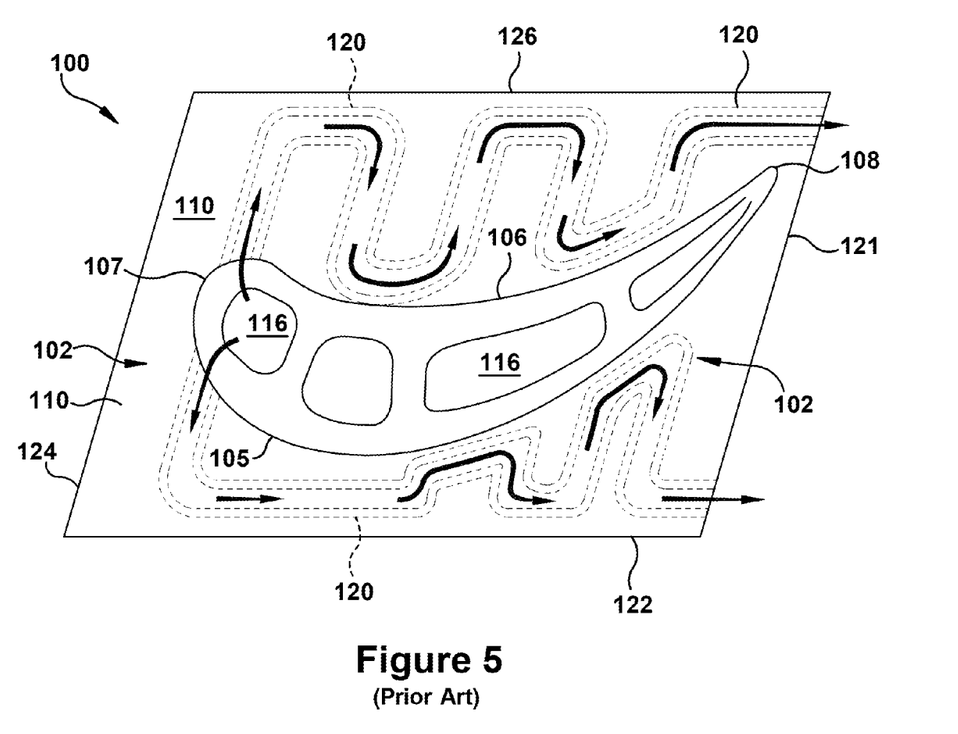
FIG. 5 illustrates a top view of a turbine rotor blade having a platform with interior cooling channels according to an alternative conventional design.

FIGS. 4 and 5 illustrate another type of conventional design for platform cooling. In this case, the cooling circuit is contained within the rotor blade 100 and does not involve the shank cavity 119, as depicted. Cooling air is extracted from one of the cooling passages 116 that extend through the core of the blade 110 and directed aft through cooling channels 120 formed within the platform 110 (i.e., "platform cooling channels 120"). As shown by the several arrows, the cooling air flows through the platform cooling channels 120 and exits through outlets in the aft edge 121 of the platform 110 or from outlets disposed along the suction side edge 122. (Note that in describing or referring to the edges or faces of the rectangular platform 110, each may be delineated based upon its location in relation to the suction face 105 and pressure face 106 of the airfoil 102 and/or the forward and aft directions of the engine once the blade 100 is installed. As such, as one of ordinary skill in the art will appreciate, the platform may include an aft edge 121, a suction side edge 122, a forward edge 124, and a pressure side edge 126, as indicated in FIGS. 3 and 4. In addition, the suction side edge 122 and the pressure side edge 126 also are commonly referred to as "slashfaces" and the narrow cavity formed therebetween once neighboring rotor blades 100 are installed may be referred to as a "slashface cavity".)

It will be appreciated that the conventional designs of FIGS. 4 and 5 have an advantage over the design of FIG. 3 in that they are not affected by variations in assembly or installation conditions. However, conventional designs of this nature have several limitations or drawbacks. First, as illustrated, only a single circuit is provided on each side of the airfoil 102 and, thus, there is the disadvantage of having limited control of the amount of cooling air used at different locations in the platform 110. Second, conventional designs of this type have a coverage area that is generally limited. While the serpentine path of FIG. 5 is an improvement in terms of coverage over FIG. 4, there are still dead areas within the platform 110 that remain uncooled. Third, to obtain better coverage with intricately formed platform cooling channels 120, manufacturing costs increase dramatically, particularly if the cooling channels having shapes that require a casting process to form. Fourth, these conventional designs typically dump coolant into the hot gas path after usage and before the coolant is completely exhausted, which negatively affects the efficiency of the engine. Fifth, conventional designs of this nature generally have little flexibility. That is, the channels 120 are formed as an integral part of the platform 110 and provide little or no opportunity to change their function or configuration as operating conditions vary. In addition, these types of conventional designs are difficult to repair or refurbish.

As a result, conventional platform cooling designs are lacking in one or more important areas. There remains a need for improved apparatus, systems, and methods that effectively and efficiently cool the platform region of turbine rotor blades, while also being cost-effective to construct, flexible in application, and durable.

BRIEF DESCRIPTION OF THE INVENTION

The present application thus describes a platform cooling arrangement for a turbine rotor blade that, in one embodiment, includes: a platform slot formed through at least one of the pressure side slashface and the suction side slashface; a removably-engaged impingement insert that separates the platform into two radially stacked plenums, a first plenum that resides inboard of a second plenum; a high-pressure connector that connects the first plenum to the high-pressure coolant region of the interior cooling passage; and a low-pressure connector that connects the second plenum to the low-pressure coolant region of the interior cooling passage; wherein the impingement insert comprises a plurality of impingement apertures. The turbine rotor blade may have a platform at an interface between an airfoil and a root. The rotor blade may include an interior cooling passage formed therein that extends from a connection with a coolant source at the root to at least the approximate radial height of the platform. In operation, the interior cooling passage may include a high-pressure coolant region and a low-pressure coolant region. Along a side that coincides with a pressure side of the airfoil, a pressure side of the platform may include a topside extending circumferentially from the airfoil to a pressure side slashface. Along a side that coincides with a suction side of the airfoil, a suction side of the platform may include a topside extending circumferentially from the airfoil to a suction side slashface.

In an alternative embodiment, the present application further describes a method of creating a platform cooling arrangement for the turbine rotor blade, the method comprising the steps of: forming a platform slot in the platform, the platform slot extending circumferentially from a mouth formed in the pressure side slashface; from within the formed platform slot, machining an high-pressure connector that connects a first predetermined location within the platform slot to the high-pressure coolant region of the interior cooling passage; from within the formed platform slot, machining an low-pressure connector that connects a second predetermined location within the platform slot to the low-pressure coolant region of the interior cooling passage; forming an impingement insert that includes a plurality of impingement apertures and comprises a predetermined configuration that desirably corresponds with the size of the platform slot; and installing the impingement insert within the platform slot. Once installed, the impingement insert substantially separates the platform into two radially stacked plenums, a pre-impingement coolant plenum that resides inboard of a post-impingement coolant plenum. The turbine rotor blade may have a platform at an interface between an airfoil and a root, wherein the rotor blade includes an interior cooling passage formed therein that extends from a connection with a coolant source at the root to at least the approximate radial height of the platform. In operation, the interior cooling passage comprises a high-pressure coolant region and a low-pressure coolant region, and wherein, along a side that coincides with a pressure side of the airfoil, a pressure side of the platform includes A topside extending circumferentially from the airfoil to a pressure side slashface.

These and other features of the present application will become apparent upon review of the following detailed description of the preferred embodiments when taken in conjunction with the drawings and the appended claims.

BRIEF DESCRIPTION OF THE DRAWINGS

These and other features of this invention will be more completely understood and appreciated by careful study of the following more detailed description of exemplary embodiments of the invention taken in conjunction with the accompanying drawings, in which.

DETAILED DESCRIPTION OF THE INVENTION

Figure 7:
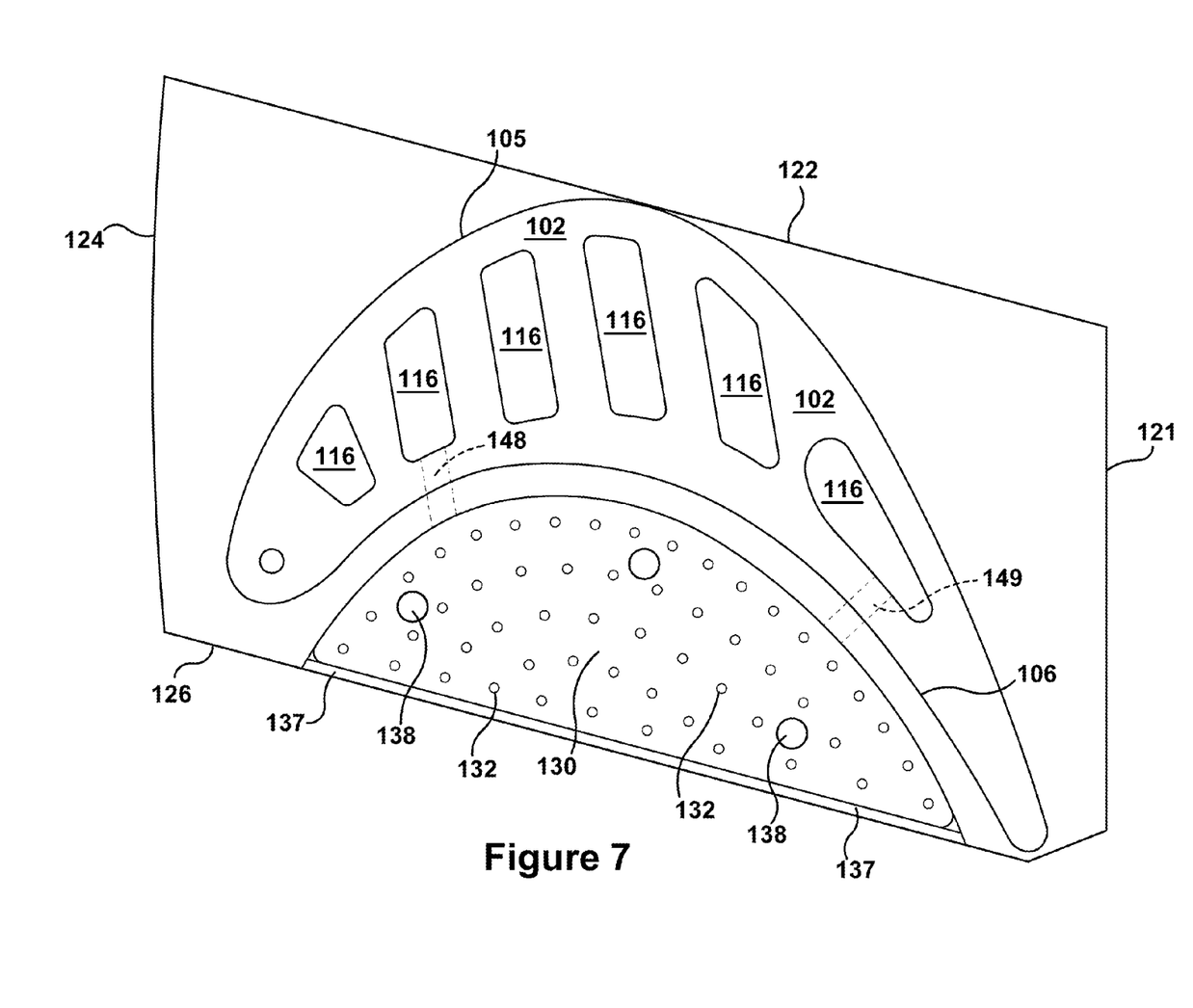
FIG. 7 illustrates a top with partial cross-sectional view of the turbine rotor blade and platform impingement insert according to an exemplary embodiment of the present invention.

It will be appreciated that turbine blades that are cooled via the internal circulation of a coolant typically include an interior cooling passage 116 that extends radially outward from the root, through the platform region, and into the airfoil, as described above in relation to several conventional cooling designs. It will be appreciated that certain embodiments of the present invention may be used in conjunction with conventional coolant passages to enhance or enable efficient active platform cooling, and the present invention is discussed in connection with a common design: an interior cooling passage 116 having a winding or serpentine configuration. As depicted in FIG. 7, the serpentine path is typically configured to allow a one-way flow of coolant and includes features that promote the exchange of heat between the coolant and the surrounding rotor blade 100. In operation, a pressurized coolant, which typically is compressed air bled from the compressor (though other types of coolant, such as steam, also may be used with embodiments of the present invention), is supplied to the interior cooling passage 116 through a connection formed through the root 104. The pressure drives the coolant through the interior cooling passage 116, and the coolant convects heat from the surrounding walls.

As the coolant moves through the cooling passage 116, it will be appreciated that it loses pressure, with the coolant in the upstream portions of the interior cooling passage 116 having a higher pressure than coolant in downstream portions. As discussed in more detail below, this pressure differential may be used to drive coolant across or through cooling passages formed in the platform. It will be appreciated that the present invention may be used in rotor blades 100 having internal cooling passages of different configurations and is not limited to interior cooling passages having a serpentine form. Accordingly, as used herein, the term "interior cooling passage" or "cooling passage" is meant to include any passage or hollow channel through which coolant may be circulated in the rotor blade. As provided herein, the interior cooling passage 116 of the present invention extends to at least to the approximate radial height of the platform 116, and may include at least one region of relatively higher coolant pressure (which, hereinafter, is referred to as a "region of high pressure" and, in some cases, may be an upstream section within a serpentine passage) and at least one region of relatively lower coolant pressure (which, hereinafter, is referred to as a "region of low pressure" and, relative to the region of high pressure, may be a downstream section within a serpentine passage).

In general, the various designs of conventional internal cooling passages 116 are effective at providing active cooling to certain regions within the rotor blade 100. However, as one of ordinary skill in the art will appreciate, the platform region proves more challenging. This is due, at least in part, to the platform's awkward geometry—i.e., its narrow radial height and the manner in which it juts away from the core or main body of the rotor blade 100. However, given its exposures to the extreme temperatures of hot gas path and high mechanical loading, the cooling requirements of the platform are considerable. As described above, conventional platform cooling designs are ineffective because they fail to address the particular challenges of the region, are inefficient with their usage of coolant, and/or are costly to fabricate.

Figure 6:
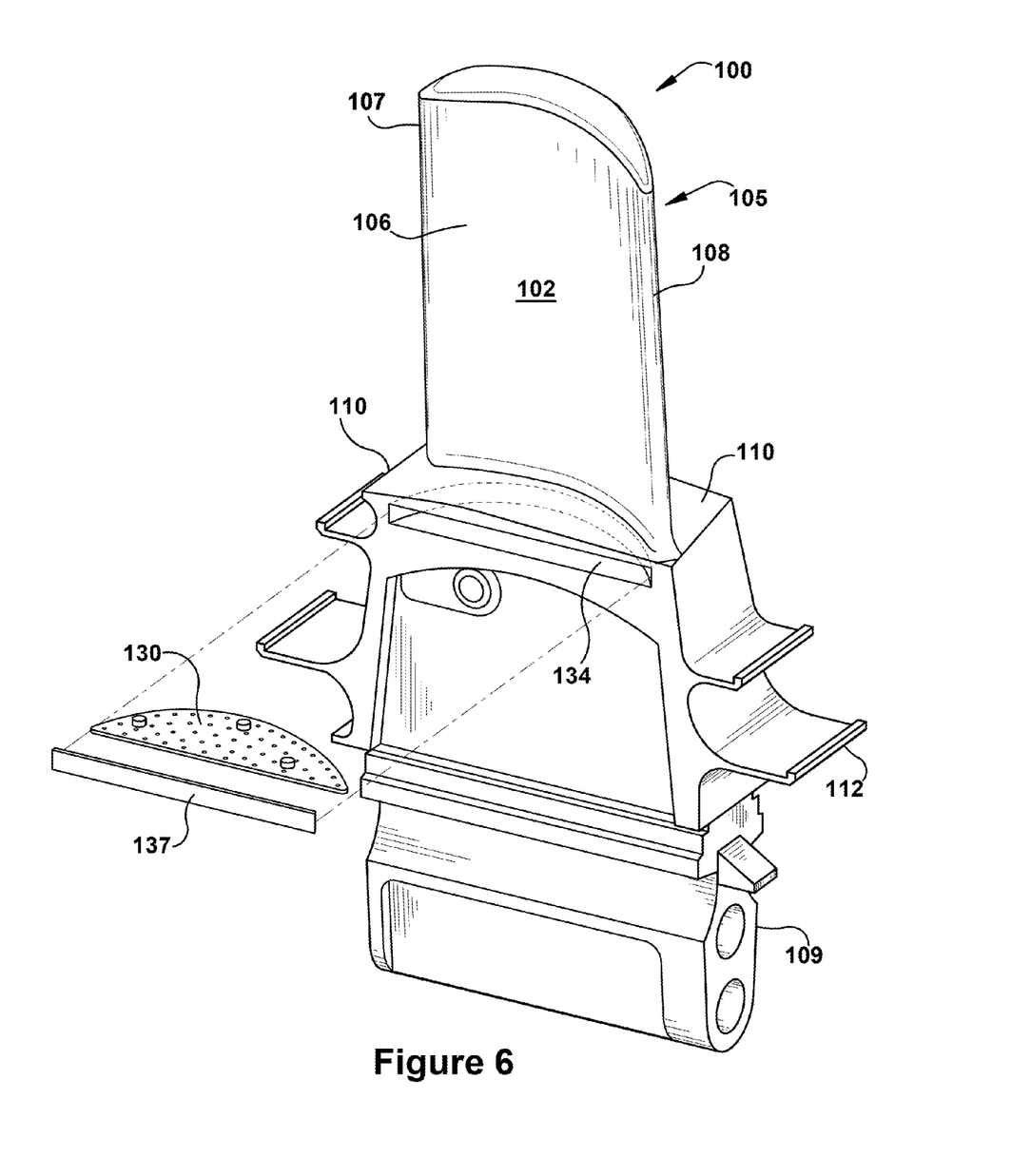
FIG. 6 illustrates a perspective view of a turbine rotor blade and platform impingement insert in disassembled state according to an exemplary embodiment of the present invention.

FIGS. 6 through 12 provide several views of exemplary embodiments of the present invention. Referring to FIGS. 6, a perspective view of a turbine rotor blade 100 and an impingement insert 130 according to an embodiment of the present invention is provided. As shown, the present invention generally includes a removable impingement insert 130 that is installed within a turbine rotor blade 100. More specifically, the platform 110 of the rotor blade 100 may include a platform slot 134 that is formed so that the impingement insert 130 fits therein. In one preferred embodiment, as shown, the platform slot 134 may be positioned in the pressure side edge or slashface 126, though other locations along the other edges of the platform 110 are also possible, such as the suction side slashface 122. The platform slot 134 may have a rectangular shaped mouth, and may be described as including an outboard surface or ceiling 135 and an inboard surface or floor 136. As shown, the mouth may be configured such that it is relatively thin in the radial direction and relatively wide in the axial direction. It will be appreciated that, from the mouth, the platform slot 134 extends circumferential into the platform 110, thereby forming a cavity therein.

The platform impingement insert 130 may have a planar, thin, disk-like/plate shape and may be configured such that it fits within the platform slot 134 and, generally, has a similar profile (i.e., the vantage point of FIG. 7) as the platform slot 134. The impingement insert 130 may include a plurality of impingement apertures 132, the function of which will be discussed in more detail below. The impingement insert 130 also may include a spacer 138 that extends from an outboard surface. In addition, a closure 137 may be included that encloses the mouth of the platform slot 134. The closure 137, as shown, has a flat, rectangular outer face that, once the impingement insert 130 is properly installed within the platform slot 134, substantially covers, blocks, or seals the mouth of the platform slot 134. In some preferred embodiments, as discussed in more detail below, the closure 137 prevents coolant from exiting the blade 100 through the mouth of the platform slot 134.

The shape of the platform slot 134 may vary. In a preferred embodiment, as more clearly shown in FIG. 7, the platform slot 134 may extend circumferentially from the pressure side slashface or edge 126. It will be appreciated that the platform slot 134, in this preferred embodiment, narrows as it extends from the pressure side slashface 126 toward the center of the platform 110. The narrowing may generally correspond to the curved profile that is formed at the junction of the airfoil pressure face 106 and the platform 110. As such, in profile (i.e., the shape from the vantage point of FIG. 7), the platform slot 134 may have a curved back or inner wall that relates closely to the curved profile of the airfoil pressure face 106. It should be apparent to those skilled in the art that other configurations of the platform slot 134 also may be employed. However, it will be appreciated that the preferred embodiments of FIGS. 6 through 11 effectively address the cooling requirements for a large coverage area, which includes some of the more difficult areas within the platform 110 to cool. Those of ordinary skill in the art will appreciate that other performance advantages and efficiencies are possible.

The impingement insert 130 and the platform slot 134 may be configured such that, once assembled, a pair of radially stacked plenums 139, 140 are formed within the platform slot 134. More particularly, as shown more clearly in FIG. 8, the impingement insert 130 substantially bisects the platform slot 134 such that a first plenum 139 (which may also be referred to as an "inboard plenum" or "pre-impingement plenum") is formed along the underside of the impingement insert 130 and a second plenum 140 (which may also be referred to as an "outboard plenum" or "post-impingement plenum") is formed along the topside of the impingement insert 130.

Figure 8:
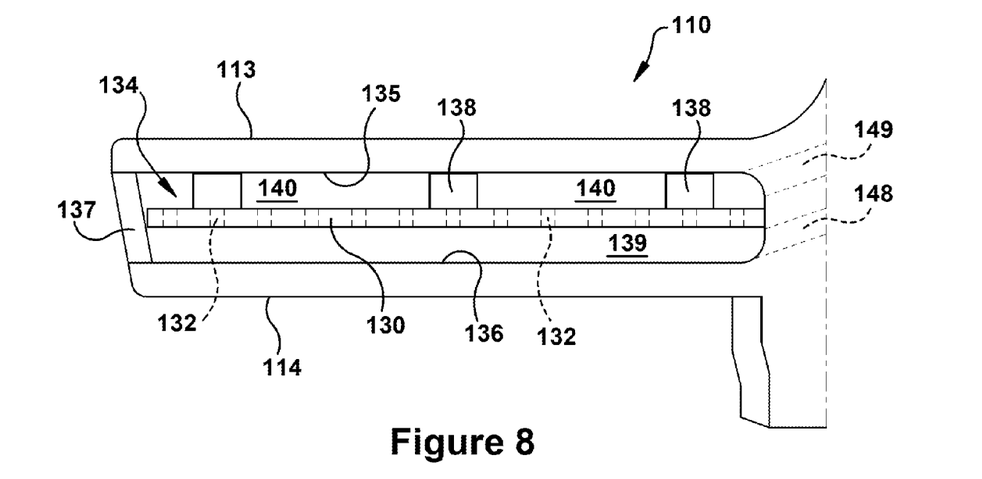
FIG. 8 illustrates a side with partial cross-sectional view of the turbine rotor blade and platform impingement insert according to an exemplary embodiment of the present invention.

As illustrated most clearly in FIGS. 7 and 8, two connectors, a high-pressure connector 148 and a low-pressure connector 149, may be provided to connect the interior cooling passage 116 to the platform slot 134 in a desired manner. While not specifically indicated, it will be appreciated that the following description assumes that the upstream portions of the interior cooling passage 116 resides toward the leading edge 107 of the turbine blade 100 and that the downstream portions of the interior cooling passage 116 resides toward the trailing edge 108 of the turbine blade 100. (While this configuration is typically used, it is not necessary for the practice of the current invention as the location of the platform slot 134 and the connectors 148, 149 may be adjusted to fit other configurations.) As shown in FIG. 8, in one preferred embodiment, the high-pressure connector 148 connects to the platform slot 134 at a more inward radial position than the low-pressure connector 149. In this manner, the high-pressure connector 148 may be configured to connect to the outboard plenum 140, and the low-pressure connector 149 may be configured to connect to the inboard plenum 139.

Figure 9:
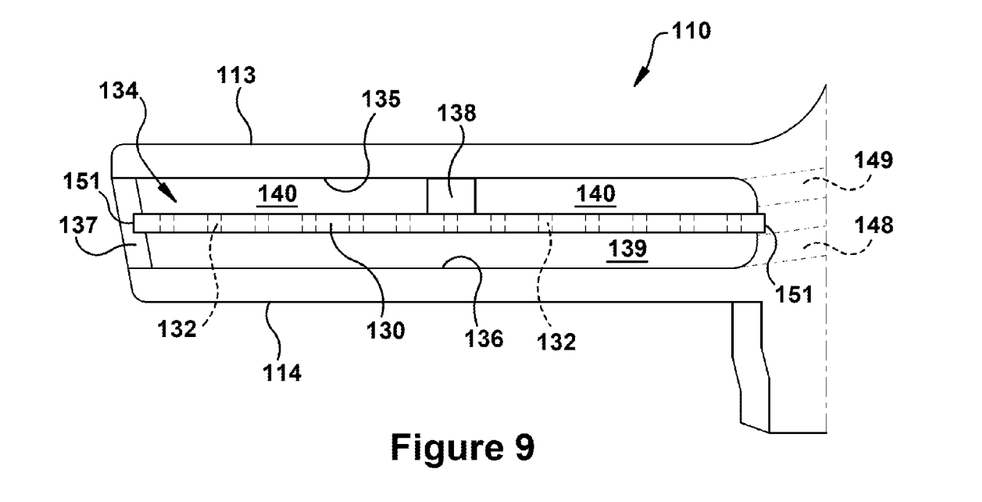
FIG. 9 illustrates a side with partial cross-sectional view of the turbine rotor blade and platform impingement insert according to an exemplary embodiment of the present invention.

FIG. 9 illustrates another embodiment of the present invention. In FIG. 9, the platform slot 134 is configured with a ledge or notch 151 which may support the impingement insert 130 around its periphery. As shown, a spacer 138 may still be included for support along the central areas of the insert 130, or, in other embodiments, the spacer 138 may be removed altogether. It will be appreciated that the notch 151 may enhance the sealing around the insert 130 such that more of the coolant is directed through the impingement apertures. If a ledge 151 is used, it will be appreciated that the ledge will be formed such that the centrifugal loading forces the insert 130 against the ledge 151 during operation of the engine, and that the ledge 151 will be configured such that, when this occurs, the insert 151 is held in a desirable position.

In operation, a coolant may enter the interior cooling passage 116 at a position near the leading edge 107 of the airfoil 102 and alternately flow radially outward/inward through the interior cooling passage 116 as the it meanders in an aftwise direction. As shown, the high-pressure connector 148 may be configured such that an upstream (and higher pressure) portion of the interior cooling passage 116 fluidly communicates with a predetermined portion of the platform slot 134, which, as described, is the inboard plenum 139. And, the low-pressure connector 149 may be configured such that a downstream portion of the interior cooling passage fluidly communicates with a predetermined portion of the platform slot 134, which, as described, is the outboard plenum 140.

Though in certain embodiments, the insert 130 may be rigidly affixed in a preferred location, in a preferred embodiment, the impingement insert 130, upon assembly, may be allowed to remain free-floating in the platform slot 134. That is, the impingement insert 130 is positioned in the platform slot 134 and not affixed to any of the walls of the platform slot 134. The closure 137 then may be used to seal the mouth of the platform slot 134. Thereby, the insert 130 may be retained within the platform slot 134, but still allowed some movement. In a preferred embodiment, the profile of the platform insert 130 matches the profile of the platform slot 134 closely, with the profile of the platform insert 130 being just smaller. In this case, it will be appreciated that, once the platform insert 130 is placed within the platform slot 134, the insert 130 has little clearance between its outer periphery and the surrounding walls of the slot 134 and, on one side, the closure 137. The insert 130, thusly, is substantially prevented from significant movement in the axial and circumferential directions. In some embodiments, as shown, the radial height of the impingement insert 130 is significantly less than the radial height of the platform slot 134. This configuration may provide the insert 130 with some limited movement in the radial direction.

The closure 137 may be sealed via conventional methods. This may be done to retain the insert 130 in the slot 134 and also to prevent or discourage leakage through the slashface and/or the escape of coolant into the hot gas-path at this location. It will be appreciated that preventing leakage through the pressure side slashface 126 means that substantially all of the coolant flowing through the platform slot 134 is directed back into the interior cooling passage 116, where it may be further used to cool other areas of the blade 100 or employed in some other fashion. In an alternative embodiment, the closure 137 may include a limited number of impingement apertures (not shown) that direct an impinged flow of coolant within the slashface cavity that is formed between two installed rotor blades.

Figure 10:
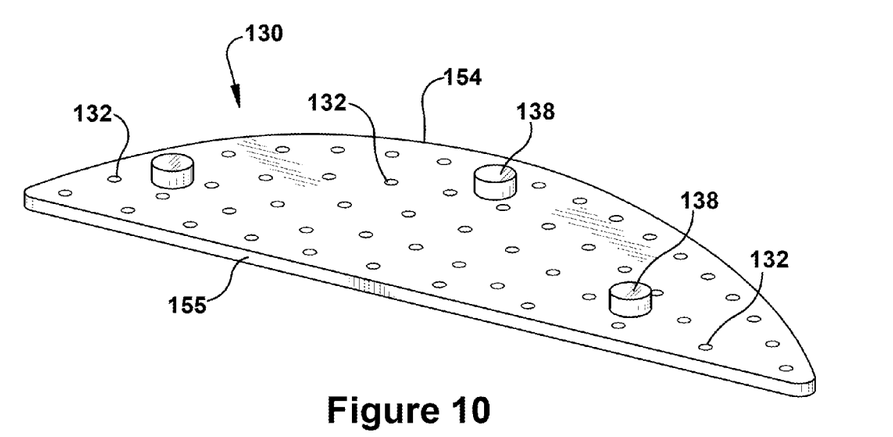
FIG. 10 illustrates a perspective view of an impingement insert according to an exemplary embodiment of the present invention.
Figure 11:
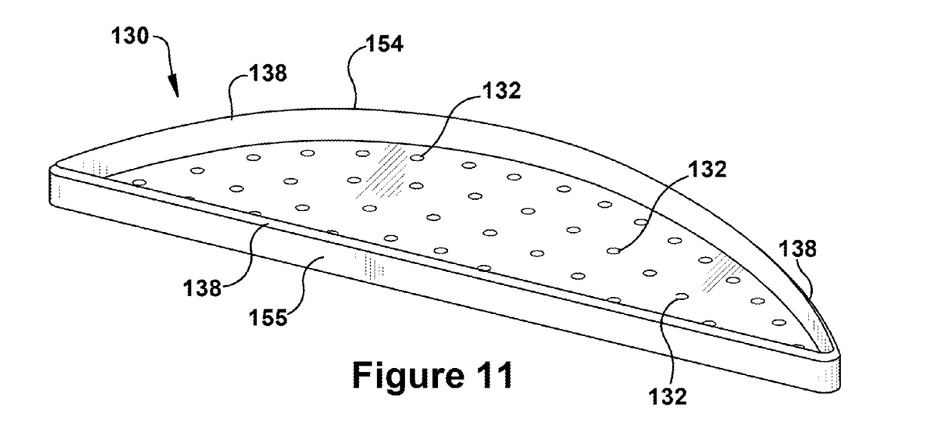
FIG. 11 illustrates a perspective view of an impingement insert according to an alternate exemplary embodiment of the present invention.

As shown most clearly in FIGS. 10 and 11, to provide cooling to the platform 110 the impingement insert 130 generally includes a plurality of impingement apertures 132. The impingement apertures 132 of the insert 130 may be arranged in multiple rows, though other configurations are possible. The impingement insert 130, as shown, may include a curved edge 154 and a straight edge 155. In an embodiment of the present application, the curved edge 154 may approximately coincide in shape to the curved profile of the airfoil 102. The rows of the impingement apertures 132 may be substantially perpendicular or oblique to the straight edge 155 of the impingement insert 130. However, the impingement apertures 132 may be arranged in any other configuration (for example, staggered) with out deviating from the scope of the present application.

It will be appreciated that the impingement apertures 132 may be configured to focus impinged, high velocity streams of coolant against the ceiling 135 of the platform slot 134. Because the ceiling 135 opposes the platform topside 113 across a relative narrow portion of the platform 134, cooling the ceiling 135 in this manner is an effective way to cool the platform topside 113, which, since it is directly exposed to the hot gas path during operation, constitutes an area of the need. As stated, these streams of coolant are driven by the pressure differential that exists between the locations at which the high-pressure connector 148 and the low-pressure connector 149 connect to the interior cooling passage 160. It will be appreciated that such impingement cooling may enhance the cooling effect of the coolant flowing through the platform slot 134. In an embodiment of the present application, the impingement apertures 132 may be substantially cylindrical in shape. However, other shapes of the impingement apertures 132, such as, but not limited to, cuboidal, prismatic, and the like, may also be possible. Further, the impingement apertures 132 may be oriented substantially perpendicular to the surface of the impingement insert 130. The impingement apertures 132 may also be obliquely oriented with respect to the surface of the impingement insert 130 without departing from the scope of the present application.

As stated, in an embodiment of the present application, the impingement insert 130 may include a spacer 138. It will be appreciated that, during operation, centrifugal loading will force the insert 130 against the ceiling 135 of the platform slot 134. The spacers 138, thus, may be used to establish the radial height of the first and second plenums 139, 140 during operation of the engine. In a preferred embodiment, as shown in FIG. 10, the spacer 138 may comprise several cylindrical protuberances. The protuberances may have the same height such that the height of the second plenum 140 is relatively constant across the platform slot 134 during operation. It will be appreciated that the height of the second plenum 140 (i.e., the height of the spacer 138) may be based on a clearance at which impingement cooling of the ceiling 135 has a desired heat transfer characteristic or is approximately maximized.

In another embodiment of the present application, as shown in FIG. 11, the spacer 138 may include a raised edge that extends around the circumference of the impingement insert 130. In this case, the configuration of the spacer 138 is used to enhance the separation or seal between the first plenum 139 and the second plenum 140, as, in operation, centrifugal loading forces the raised edge 138 against the slot ceiling 135. It will be appreciated that this would decrease the amount of coolant that flows through this potential leakage path, which would decreases the amount of coolant that bypasses the impingement apertures 132 and, thereby improving cooling performance by forcing more coolant through the intended pathway.

In an embodiment of the present application, the first plenum 139 may include at least one inlet or inlet channel (which may be referred to as a high-pressure connector 148), which is in fluid communication with the high pressure-region of the interior cooling passage 116. The second plenum 140 may include at least one outlet or outlet channel (which may be referred to as a low-pressure connector 149) that is in fluid communication with the low-pressure coolant region of the interior cooling passage 116. In various embodiments of the present application, the high-pressure connector 148 and/or the low-pressure connector 149 may be manufactured by one or more methods, for example, but not limited to, machining, casting and the like.

During operation, the coolant flowing through the high-pressure coolant region of the interior cooling passage 116 may enter the first plenum 139 via the high-pressure connector 148. Thereafter, the coolant may flow through the impingement apertures 132 to the second plenum 140, and substantially perform the impingement cooling of the platform 110 by striking against the ceiling 135 of the platform slot 134. The coolant then may exit the second plenum 140 to the low-pressure coolant region of the interior cooling passage 116 via the low-pressure connector 149. As stated, due to the aforementioned functional relationship between various components, the first plenum 139 and the second plenum 140 also may be referred to as a pre-impingement plenum and a post-impingement plenum, respectively.

Figure 12:
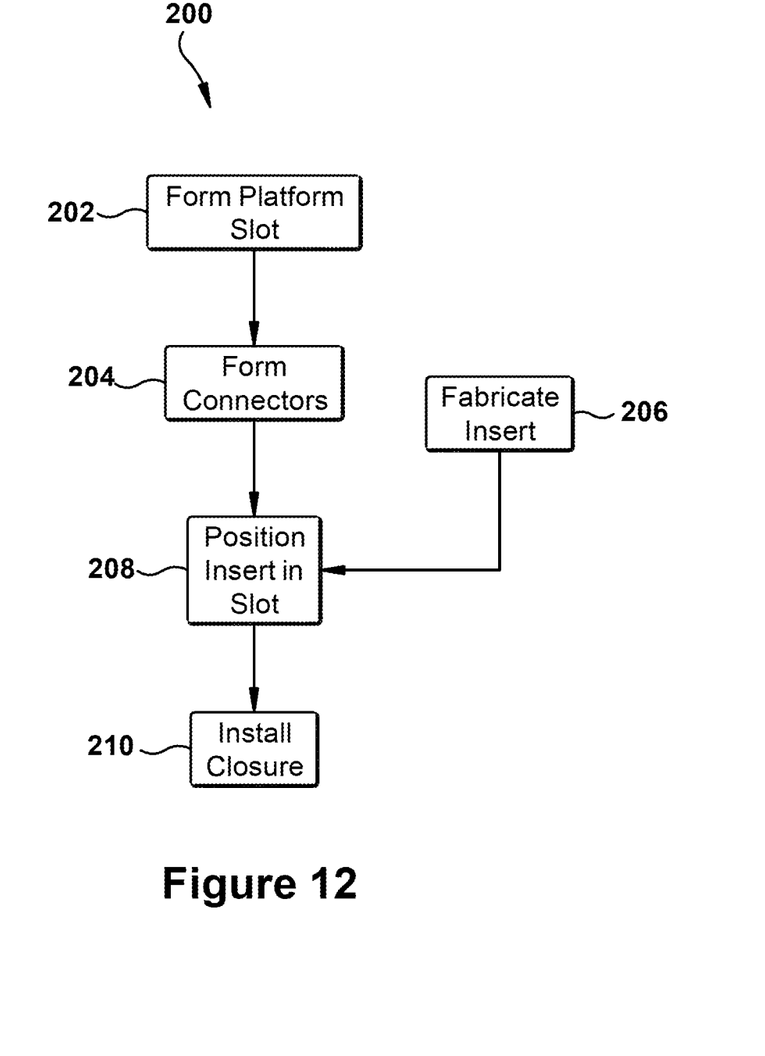
FIG. 12 illustrates a flow diagram of a method according to an exemplary embodiment of the present invention.

The present invention further includes a novel method of forming effective interior cooling channels within the platform region of the rotor blade in a cost-effective and efficient manner. As illustrated in FIG. 12, as an initial step 202, the platform slot 134 may be formed in the pressure side slashface 126 of the platform 110. Because of the relatively uncomplicated shape of the platform slot 134, it may be cost-effectively formed using conventional machining or simple casting processes. Expensive casting processes used for more intricate designs may be avoided.

At step 204, once the platform slot 134 is formed, the high-pressure connector 148 and the low-pressure connector 149 may be created using a conventional machining process. More specifically, given the access provided by the formed platform slot 134, the connectors 148, 149 may be formed with a conventional line-of-sight machining or drilling process.

Separately, at step 206, the platform impingement insert 130 may be fabricated in a desired manner, the size and shape of which desirably relate to the size of the platform slot 134, as discussed above.

At step 208, the impingement insert 130 then may be installed within the platform slot 134. As stated, in a preferred embodiment, the impingement insert 130 may be positioned within the slot 134 but not attached to any of the walls of the slot 134, i.e., the insert 130 may remain free-floating.

Finally, at step 210, the closure 137 may be installed. This may be done via conventional methods and, as described, may seal the slot 134 such that the coolant that flows into the slot 134 from the interior cooling passages 116 of the blade 100 is returned.

In operation, the cooling apparatus of the present invention may function as follows. A portion of the coolant supply flowing through the interior cooling passage 116 enters the inboard or pre-impingement plenum 139 through the high-pressure connector 148. The coolant is impinged through the impingement apertures 132 of the insert 130 and directed into the outboard or post-impingement plenum 140 and toward the ceiling 135 of the slot 134, where the coolant convects heat from the platform 110. From the post-impingement plenum 140, the coolant may be returned to the interior cooling passage 116 of the blade 100 via the low-pressure connector 149. In this manner, the platform cooling arrangement of the present invention extracts a portion of the coolant from the interior cooling passage 116, uses the coolant to remove heat from the platform 110, and then returns the coolant to the interior cooling passage 116, where it may be used further.

It will be appreciated that the present invention provides a mechanism by which the platform region of a combustion turbine rotor blade may be actively cooled. As stated, this region is typically difficult to cool and, given the mechanical loads of the area, is a location that receives high distress as firing temperatures are increased. Accordingly, this type of active platform cooling is a significant enabling technology as higher firing temperatures, increased output, and greater efficiency are sought.

Further, it will be appreciated that the removable platform impingement insert 130 of the present application provides greater flexibility to redesign or reconfigure or retrofit or tune the cooling arrangements on existing rotor blades. That is, the platform impingement insert 130 allows the cooling circuit through the platform 110 to be replaced in a cost effective and convenient manner if operating conditions change or greater cooling is required through the platform region. In addition, the replaceable structure is considerably helpful during the testing phase of in that alternative designs may be tested more conveniently. The removable insert also allows the simplified formation of impingement cooling structures. Whereas before, such complex geometries necessarily meant a costly casting process, the present application teaches methods by which internal impingement cooling structures may be formed through a combination of simple machining and/or simplified casting processes. Finally, the present application teaches a method by which the platform 110 may be cooled using interior channels that do not vent directly into the hot gas-path from the platform 110 itself As stated, this "recycling" of coolant generally increases the efficiency of its usage, which increases the efficiency of the engine.

Further, as described, the insert 130 may remain free-floating within the platform slot 134, which may provide several performance advantages. First the movement may have a dampening effect, which could be used to remove or reduce some of the undesirable vibration that occurs during engine operation. Further as one of ordinary skill and art will appreciate, the free-floating nature of the assembly would prevent thermal induced strain in the rotor blade, thereby reducing platform stresses.

As one of ordinary skill in the art will appreciate, the many varying features and configurations described above in relation to the several exemplary embodiments may be further selectively applied to form the other possible embodiments of the present invention. For the sake of brevity and taking into account the abilities of one of ordinary skill in the art, all of the possible iterations is not provided or discussed in detail, though all combinations and possible embodiments embraced by the several claims below or otherwise are intended to be part of the instant application. In addition, from the above description of several exemplary embodiments of the invention, those skilled in the art will perceive improvements, changes, and modifications. Such improvements, changes, and modifications within the skill of the art are also intended to be covered by the appended claims. Further, it should be apparent that the foregoing relates only to the described embodiments of the present application and that numerous changes and modifications may be made herein without departing from the spirit and scope of the application as defined by the following claims and the equivalents thereof.

We claim:

1. A platform cooling arrangement in turbine rotor blade having a platform at an interface between an airfoil and a root, wherein the rotor blade includes an interior cooling passage formed therein that extends from a connection with a coolant source at the root to at least the approximate radial height of the platform, wherein, in operation, the interior cooling passage comprises a high-pressure coolant region and a low-pressure coolant region, and wherein, along a side that coincides with a pressure side of the airfoil, a pressure side of the platform comprises a topside extending circumferentially from the airfoil to a pressure side slashface, and along a side that coincides with a suction side of the airfoil, a suction side of the platform comprises a topside extending circumferentially from the airfoil to a suction side slashface, the platform cooling arrangement comprising:

a platform slot formed through at least one of the pressure side slashface and the suction side slashface;

a removably-engaged impingement insert that separates the platform into two radially stacked plenums, a first plenum that resides inboard of a second plenum;

a high-pressure connector that connects the first plenum to the high-pressure coolant region of the interior cooling passage; and a low-pressure connector that connects the second plenum to the low-pressure coolant region of the interior cooling passage;

wherein the impingement insert comprises a plurality of impingement apertures.

2. The platform cooling arrangement according to claim 1, wherein:

the platform comprises a planar topside that is approximately parallel to a planar underside; and the platform slot comprises a planar ceiling that is in proximity to the topside of the platform and a planar floor that is in proximity to the underside of the platform.

3. The platform cooling arrangement according to claim 2, wherein:

the platform slot is formed through the pressure side slashface;

the impingement insert comprises a radially thin plate structure comprising a planar outboard surface and a planar inboard surface; and the impingement apertures extend through the impingement insert from the outboard surface to the inboard surface and are configured to impinge a flow of coolant and direct the impinged flow of coolant against the ceiling of the platform slot.

4. The platform cooling arrangement according to claim 3, wherein the location at which the high-pressure connector connects to the platform slot comprises a forward position in relation to the location the at which the low-pressure connector connects to the platform slot.

5. The platform cooling arrangement according to claim 3, wherein the platform slot is configured such that, from a mouth along the pressure side slashface, the axial width of the platform slot narrows as the platform slot extends circumferentially into the platform.

6. The platform cooling arrangement according to claim 3, wherein, in profile, an inner wall of the platform slot is curved, the curved profile approximately corresponding in shape and position to the curved profile of the pressure side of the airfoil where the pressure side of the airfoil intersects the platform.

7. The platform cooling arrangement according to claim 6, wherein the inner wall comprises a notch, the notch being configured such that the periphery of the impingement insert inserts snugly therein.

8. The platform cooling arrangement according to claim 6, wherein the inner wall comprises a ledge, the ledge being configured such that, when the impingement insert is biased by the centrifugal loading of operation toward the ceiling of the platform slot, the ledge engages the periphery of the impingement insert and, thereby, maintains the impingement insert a predetermined distance from the ceiling of the platform slot.

9. The platform cooling arrangement according to claim 3, further comprising a closure that is configured to substantially seal the mouth of the platform slot such that, in operation, substantially all of the coolant flowing through the platform slot is returned to the interior cooling passage.

10. The platform cooling arrangement according to claim 2, wherein, on the outboard surface, the impingement insert comprises a spacer.

11. The platform cooling arrangement according to claim 10, wherein the spacer comprises one or more rigid protuberances that protrude from the surface of the outboard surface a predetermined length.

12. The platform cooling arrangement according to claim 11, wherein the spacer comprises a plurality of cylindrical structures.

13. The platform cooling arrangement according to claim 11, wherein the spacer comprises a raised outer edge.

14. The platform cooling arrangement according to claim 13, wherein the raised outer edge extends continuously around the periphery of the impingement insert.

15. The platform cooling arrangement according to claim 10, wherein, when biased by the centrifugal loading of operation toward the ceiling of the platform slot; the spacer is configured to maintain the outboard surface of the impingement insert a predetermined distance from the ceiling of the platform slot.

16. The platform cooling arrangement according to claim 15, wherein the predetermined distance comprises a distance that corresponds to a desired coolant impingement characteristic.

17. The platform cooling arrangement according to claim 15, wherein the impingement insert resides free-floating within the platform slot.

18. A method of creating a platform cooling arrangement for a turbine rotor blade having a platform at an interface between an airfoil and a root, wherein the rotor blade includes an interior cooling passage formed therein that extends from a connection with a coolant source at the root to at least the approximate radial height of the platform, wherein, in operation, the interior cooling passage comprises a high-pressure coolant region and a low-pressure coolant region, and wherein, along a side that coincides with a pressure side of the airfoil, a pressure side of the platform comprises a topside extending circumferentially from the airfoil to a pressure side slashface, the method comprising the steps of:

forming a platform slot in the platform, the platform slot extending circumferentially from a mouth formed in the pressure side slashface;

from within the formed platform slot, machining an high-pressure connector that connects a first predetermined location within the platform slot to the high-pressure coolant region of the interior cooling passage;

from within the formed platform slot, machining an low-pressure connector that connects a second predetermined location within the platform slot to the low-pressure coolant region of the interior cooling passage; and forming an impingement insert that includes a plurality of impingement apertures and comprises a predetermined configuration that desirably corresponds with the size of the platform slot; and installing the impingement insert within the platform slot;

wherein, once installed, the impingement insert substantially separates the platform into two radially stacked plenums, a pre-impingement coolant plenum that resides inboard of a post-impingement coolant plenum.

19. The method according to claim 18, wherein:

the first predetermined location within the platform slot comprises a location within the pre-impingement coolant plenum; and the second predetermined location within the platform slot comprises a location within the post-impingement coolant plenum.

20. The method according to claim 19, wherein the step of installing the impingement insert within the platform slot includes the steps of:

placing the impingement insert into the platform slot so that the impingement insert resides therein in a free-floating condition; and installing a closure over the mouth of the platform slot.

21. The method according to claim 20, wherein, in profile, the inner wall of the platform slot is curved, the curved profile approximately corresponding in shape and position to the curved profile of the pressure side of the airfoil where the pressure side of the airfoil intersects the platform.

22. The method according to claim 18, wherein:

the impingement insert comprises a radially thin plate structure comprising a planar outboard surface and a planar inboard surface;

the impingement apertures extend through the impingement insert from the outboard surface to the inboard surface and are configured to impinge a flow of coolant and direct the impinged flow of coolant against a ceiling of the platform slot; and on the outboard surface, the impingement insert comprises a spacer, the spacer comprising one or more rigid protuberances that protrude from the surface of the outboard surface a predetermined length;

wherein, when the impingement insert is biased by the centrifugal loading of operation toward the ceiling of the platform slot, the spacer is configured to maintain the outboard surface of the impingement insert a predetermined distance from the ceiling of the platform slot.

* * * * *